July 2, 1929.  E. GASS  1,719,362

LUBRICATING APPARATUS

Filed Aug. 18, 1925  2 Sheets-Sheet 1

Inventor:
Ernest Gass
By Marks & Clerk
Attys

July 2, 1929.    E. GASS    1,719,362
LUBRICATING APPARATUS
Filed Aug. 18, 1925    2 Sheets-Sheet 2
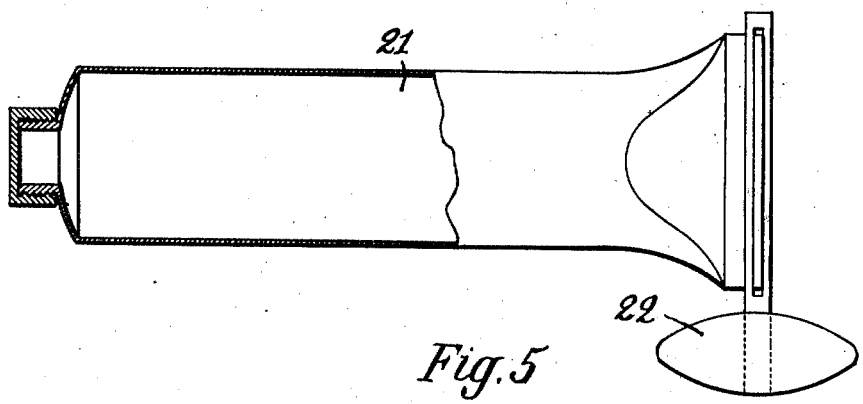
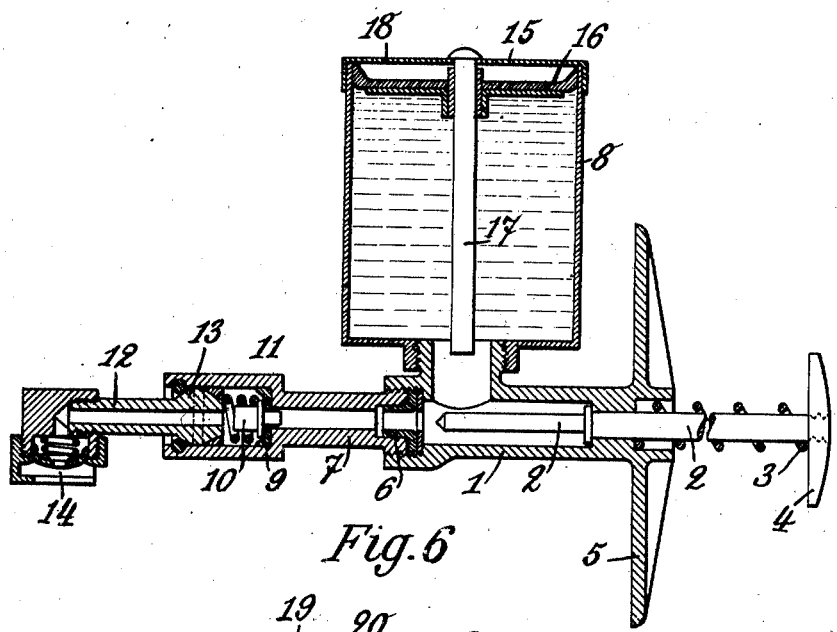
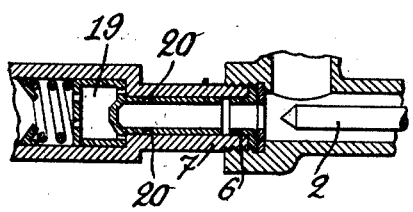

Patented July 2, 1929.

1,719,362

UNITED STATES PATENT OFFICE.

ERNEST GASS, OF CLICHY, FRANCE.

LUBRICATING APPARATUS.

Application filed August 18, 1925, Serial No. 50,919½, and in France August 27, 1924.

The present invention has for its object an apparatus for the filling of lubricating devices whereby this operation may be performed with great cleanliness and great facility, a strong pressure being obtained with a minimum effort.

In my said apparatus, an ordinary piston pump is combined with a lubricant reservoir which may be either axially or laterally disposed with reference to the said pump.

The said reservoir may be supplied by means of removable cartridges which are mounted upon a suitable fitting, or the reservoir itself may consist of an interchangeable cartridge.

The sealing of the said reservoir is assured by the use of a piston which is provided for instance with a leather packing member, which follows the lubricant as the latter is dispensed. The connection by flexible tube which is generally employed is preferably replaced by a connection consisting of a rigid tube which is mounted by a suitable joint.

The said device facilitates the removal of the head of the lubricator, and a forward thrust can be readily exercised with the rigid tube, whilst the flexible tube will bend and will rapidly become damaged.

Moreover, the lubricant is compressed by the plunger of the pump through a check valve disposed at the beginning of the said jointed tube, and as soon as the pressure ceases, the valve which is returned to its seating by its spring dispenses the lubricant contained in the jointed tube and the connecting part in such manner that none of the said lubricant will spread to the exterior, and the apparatus will remain clean in all cases.

The accompanying drawings show two modifications of the invention.

Figs. 1 to 4 relate to one modification.

Fig. 4 shows a filling tube.

Fig. 5 relates to a second modification.

Fig. 6 shows a modified form of the check valve.

Figure 1:
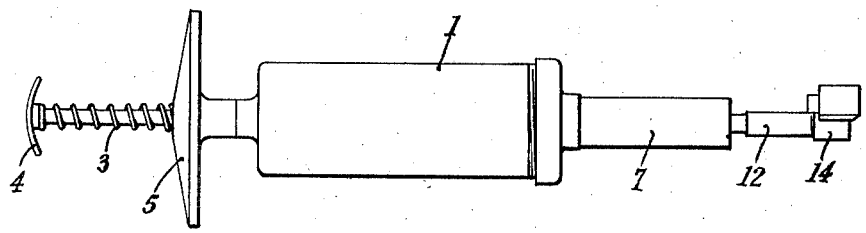
Fig. 1 is an elevational view of the apparatus.
Figure 2:
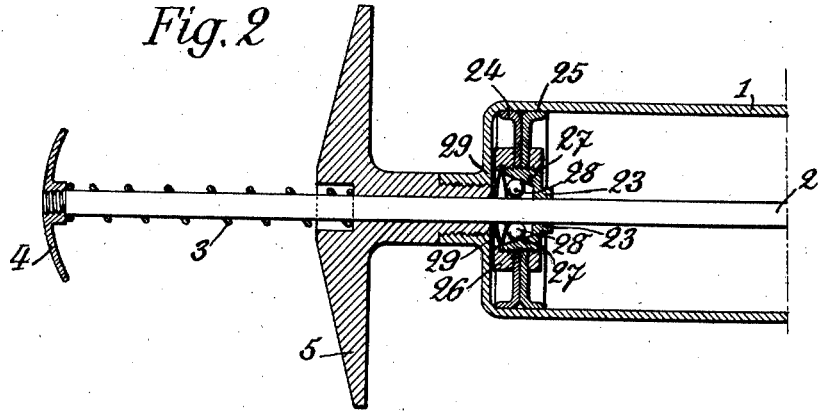
Figs. 2 and 3 are, at a larger scale, longitudinal sections respectively made at left and right of the middle part of the apparatus.
Figure 3:
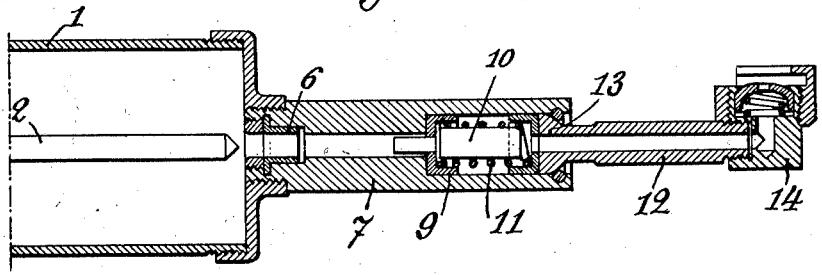

In Figs. 1 to 4, the apparatus comprises a main body 1 forming a reservoir, in the bottom of which a rod forming a piston 2 is slidable against the action of an opposing spring 3 situated exteriorly. Upon the plunger 2 is disposed an operating knob 4, and the main body is provided with a handle 5, so that by placing the knob 4 in the palm of the hand and drawing upon the handle with the fingers, one may impel the plunger 2 into the main body 1.

In this motion, the piston enters the packing member 6 of a cylinder 7, and when the pressure of the hand ceases, the plunger returns to the rear and thus produces a vacuum in the cylinder. At the moment, when the plunger escapes from the cylinder 7 there is produced in this cylinder a violent suction of the lubricant contained in the body 1. If one again moves forward the plunger 2, the lubricant will be driven into the channels through a check valve comprising the packing member 9 upon which is caused to bear a follower 10 actuated by a spring 11.

The length of the plunger 2 is such that the end of said plunger will, when at a few millimeters from the end of its stroke, enter into contact with the follower 10 which is thus driven back against the action of the spring 11. At the moment of the recoil of the plunger 2, the leather member 9 will return to its place, and there will be formed a slight vacuum in the tube 12; this will suffice to eliminate all pressure in the channels, whose capacity is small; one thus avoids all escape of the lubricant through the connecting part when the latter is separated from the lubricating apparatus.

When the reservoir 1 is empty, the cylinder 7 is unscrewed and is replaced by a tube 21 represented in Fig. 4. The latter tube, which is made of a flexible metal such as lead or tin, for instance, may be wound upon itself and emptied by means of a key 22.

The lubricant is thus caused to enter the reservoir, and then the tube 21 is removed, and can be thrown away. The sealing of the reservoir 1 may be assured in the following manner: A piston comprising a core 23 upon which two leather members 24 and 25 are held by the screwed rings 26, is loose within the body 1 and is slidable on the plunger 2. The core 23 is provided with a tapered shoulder 27 upon which are caused to bear a row of balls 28, impelled by the spring 29.

In these conditions, at the moment when the plunger 2 moves forward, the balls will advance on the surface 27 and will tend to become jammed between the said surface and the plunger 2; the result will be that the core 23 is entrained together with the leather members 24 and 25. This entraining will be more energetic according as the slope of the cone is more pronounced. This slope is preferably calculated in such manner that, as soon as the lubricant in the reservoir sets up an appreciable resistance, the core 23 will be held fast, and the balls will turn in their position. In order to prevent the escape of said balls, I have provided two concave spring washers which exercise an easy and continuous pressure upon the balls and maintain them in contact with the surface 27.

The leather member 25 is intended to prevent the passage of lubricant under pressure. The leather member 24 prevents the entrance of air when the device is filled.

The piping comprises a rigid tube 12 connected with the cylinder 7 through the medium of an articulated joint device 13. This device allows the apparatus to be placed anywhere and to be readily attached, without having the drawbacks inherent in flexible piping. Moreover, the pieces can be made by lathe turning, thus affording a great economy. The connecting piece 14 is of the grooved type in current use, but its parts are designed so as to be also turned in the lathe.

Fig. 5 relates to a modification in which the lubricant is contained in a removable cartridge 8 which is secured upon the side of the body 1, for example by screwing. The bottom of said cartridge is pierced with an air hole 15, and sealing is assured by a pressed leather member 16 guided on a rod 17 which is secured to the bottom. As the lubricant is dispensed, the piston formed by the leather member 16 will follow the surface of the lubricant due to atmospheric pressure, until the vessel is entirely emptied.

The cartridge 8, when it becomes emptied may be replaced by a similar cartridge which is filled, or it can be filled by removing the bottom 18 which is mounted by a simple fitting, and also the piston 16.

The check valve may, with equal facility, consist of a single or a differential piston, this latter form of construction being shown in Fig. 6. In this case the spring 11 acts upon the large base of the piston, and the lubricant passes through the apertures 20 which are uncovered when the pressure exercised by the plunger 2 impels the piston 19 to the left.

Obviously, the check valve device may be disposed at any point on the conduit for the discharge of the lubricant, without departing from the principle of the invention.

Claims:

1. In a lubricating apparatus, the combination of a cylindrical lubricant reservoir, a bottom or head on one of the ends of the said reservoir, a handle on the said bottom, this handle having a cylindrical hole situated in the axis of the said reservoir, a cylindrical rod acting as a piston and adapted to slide in the said hole and to pass axially through the said reservoir, an operating knob on the said rod, a free piston in the said reservoir adapted to slide upon the rod acting as a piston, a hub on the said free piston, this hub having a tapered recess, balls in the said recess adapted to bear on the one hand against the tapered wall of the said recess and on the other hand against the said rod acting as a piston, a washer acting as a spring, secured in the opening of the said recess and adapted to bear against the said balls, a bottom on the other end of the said reservoir, a cylinder on this bottom, this cylinder having a bore of the same diameter as the said rod acting as a piston, a packing member at the beginning of the said cylinder and a jointed tube on the said cylinder adapted to connect the same with the object to be lubricated.

2. In a lubricating apparatus, the combination of a cylindrical lubricant reservoir, a bottom or head on one of the ends of the said reservoir, a handle on the said bottom, this handle having a cylindrical hole situated in the axis of the said reservoir, a cylindrical rod acting as a plunger and adapted to slide in the said hole and to pass axially through the said reservoir, an operating knob on the said rod, a free piston in the said reservoir adapted to slide on the rod acting as a plunger, a bottom on the other end of the said reservoir, a cylinder on this bottom, this cylinder having a bore of the same diameter as the rod acting as a plunger, a packing member at the beginning of the said cylinder, the said cylinder being provided at its external end with a cylindrical recess, a sliding check-valve in the said cylindrical recess, a jointed tube adapted to connect the said cylinder with the object which is to be lubricated, this jointed tube having an external end which is enlarged and located in the said cylinder, and a spring provided in the said recess of the said cylinder and adapted to press the said valve against the internal bottom of the said recess and the said enlargement of the jointed tube against the external bottom of the recess.

3. In a lubricating apparatus, the combination of a cylindrical lubricant reservoir, a bottom on one of the ends of the said reservoir, a handle on the said bottom, this handle having a cylindrical hole situated in the axis of the said reservoir, a cylindrical rod acting as a plunger adapted to slide in the said hole and to pass axially through the said reservoir, an operating knob on the said rod, a free piston in the said reservoir adapted to slide upon the said rod acting as a plunger, a bottom on the other end of the said reservoir, a cylinder on this bottom, this cylinder having a bore of the same diameter as the rod acting as a plunger, a packing member at the beginning of the said cylinder, the said cylinder having at its external end a cylindrical recess, a check-valve in the said recess, a movable jointed tube, the internal end of the said jointed tube being engaged in the said recess and having a rounded head, a ring adapted to constitute a seat for the said rounded head of the said jointed tube, this ring being fixed to the external orifice of the said recess of the said cylinder, and a spring in the said recess adapted to press the said valve against the internal bottom of this recess and the said rounded head of the jointed tube against the said ring.

4. In a lubricating apparatus, communicating lubricant receiving chambers, a movable lubricant ejecting plunger, slidably mounted in line with one of said chambers, and traversing the other of said chambers, a piston in the other of said chambers surrounding said plunger and means to releasably hold said piston on said plunger.

5. In a lubricating apparatus, communicating lubricant receiving chambers, a movable lubricant ejecting plunger, slidably mounted in line with one of said chambers, and traversing the other of said chambers, a piston in the other of said chambers surrounding said plunger and movable gripping means to releasably hold said piston on said plunger.

6. In a lubricating apparatus, communicating lubricant receiving chambers, a movable lubricant ejecting plunger, slidably mounted in line with one of said chambers and traversing the other of said chambers, a piston surrounding said plunger, and means to hold the piston in tight frictional engagement with said plunger, whereby the piston will move with said plunger and will remain stationary when opposed by a force greater than the frictional engagement therebetween.

7. In a lubricating apparatus, communicating lubricant receiving chambers, a movable lubricant ejecting plunger, slidably mounted in line with one of said chambers and traversing the other of said chambers, a piston surrounding said plunger, and spring pressed wedging means to hold the piston in tight frictional engagement with said plunger, whereby the piston will move with said plunger and will remain stationary when opposed by a force greater than the frictional engagement therebetween.

In testimony whereof I have hereunto affixed my signature.

ERNEST GASS.